(12) United States Patent
Takeuchi et al.

(10) Patent No.: US 10,239,308 B2
(45) Date of Patent: Mar. 26, 2019

(54) LIQUID DISCHARGE CONTROL APPARATUS, LIQUID DISCHARGE CONTROL METHOD, AND LIQUID DISCHARGE CONTROL PROGRAM

(71) Applicant: SEIKO EPSON CORPORATION, Tokyo (JP)

(72) Inventors: Yasutoshi Takeuchi, Nagano (JP); Tetsuya Matsumura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 30 days.

(21) Appl. No.: 15/459,364

(22) Filed: Mar. 15, 2017

(65) Prior Publication Data
US 2017/0274643 A1    Sep. 28, 2017

(30) Foreign Application Priority Data
Mar. 23, 2016   (JP) ................... 2016-058108

(51) Int. Cl.
| | |
|---|---|
| H04N 1/60 | (2006.01) |
| B41J 2/21 | (2006.01) |
| G06F 3/12 | (2006.01) |
| G06K 15/02 | (2006.01) |
| B41J 2/045 | (2006.01) |

(52) U.S. Cl.
CPC ......... B41J 2/04508 (2013.01); B41J 2/2132 (2013.01); H04N 1/6033 (2013.01); H04N 1/6097 (2013.01); H04N 1/6041 (2013.01)

(58) Field of Classification Search
None
See application file for complete search history.

(56) References Cited

U.S. PATENT DOCUMENTS

| | | | |
|---|---|---|---|
| 6,164,756 A * | 12/2000 | Takahashi | B41J 2/2132 347/14 |
| 6,174,043 B1 * | 1/2001 | Ogata | G06K 15/105 347/40 |
| 6,585,342 B1 * | 7/2003 | Mantell | B41J 2/2132 347/14 |
| 6,874,864 B1 * | 4/2005 | Maeda | B41J 2/5058 347/16 |
| 9,729,760 B2 * | 8/2017 | Negishi | G03G 15/5058 |
| 2005/0190390 A1 * | 9/2005 | Yamada | H04N 1/6058 358/1.9 |

(Continued)

FOREIGN PATENT DOCUMENTS

| JP | 2009-012390 A | 1/2009 |
|---|---|---|
| JP | 2011-189512 A | 9/2011 |

*Primary Examiner* — Beniyam Menberu (57) ABSTRACT

In order to reduce a density difference that appears when printing whose execution number of scan operations is changed is performed, a CPU acquires a plurality of color conversion LUTs; the CPU performs printing of each of normal portions of color patches using a reference LUT and performs printing of each of hitch portions of the color patches using a corresponding one of mutually different color conversion LUTs; the CPU allows a color patch having a small density difference to be input as a selection result; the CPU identifies a color conversion LUT corresponding to the selection result; and the CPU designates the color conversion LUT corresponding to the selection result as a color conversion LUT for the hitch portion.

8 Claims, 10 Drawing Sheets

(56) References Cited

U.S. PATENT DOCUMENTS

| | | | |
|---|---|---|---|
| 2008/0124097 A1* | 5/2008 | Kong | G03G 15/553 |
| | | | 399/27 |
| 2008/0158275 A1* | 7/2008 | Masuyama | B41J 2/2132 |
| | | | 347/9 |
| 2009/0015611 A1 | 1/2009 | Ochiai et al. | |
| 2010/0060691 A1* | 3/2010 | Tanase | B41J 2/04508 |
| | | | 347/14 |
| 2011/0221816 A1 | 9/2011 | Miyamoto | |
| 2012/0026227 A1* | 2/2012 | Tanaka | B41J 2/2132 |
| | | | 347/9 |
| 2012/0081768 A1* | 4/2012 | Iguchi | H04N 1/4015 |
| | | | 358/518 |
| 2012/0206744 A1* | 8/2012 | Kobayashi | H04N 1/6038 |
| | | | 358/1.9 |
| 2014/0285558 A1* | 9/2014 | Wada | B41M 5/00 |
| | | | 347/14 |
| 2016/0052263 A1* | 2/2016 | Edamura | B41J 2/2054 |
| | | | 347/14 |
| 2016/0352972 A1* | 12/2016 | Kobayashi | H04N 1/6008 |

* cited by examiner

LIQUID DISCHARGE CONTROL APPARATUS, LIQUID DISCHARGE CONTROL METHOD, AND LIQUID DISCHARGE CONTROL PROGRAM

BACKGROUND

1. Technical Field

The present invention relates to a liquid discharge control apparatus, a liquid discharge control method, and a liquid discharge control program, and in particular, it relates to a liquid discharge control apparatus, a liquid discharge control method, and a liquid discharge control program that allow multi-pass printing to be performed.

2. Related Art

In ink jet printers, printing is performed by allowing a carriage to bidirectionally move an ink head. In this bidirectional printing, a multi-pass printing is sometimes used. In this multi-pass printing, printing is performed by allowing a scan operation to be executed over a printed region a plurality of times.

Heretofore, in the multi-pass printing, after a first printing operation along an outward path, further, a second printing operation along a return path is performed. The time difference of these two printing operations will be referred to as a pass-to-pass time difference. When printing in which the pass-to-pass time difference occurs is performed, the density of a printed color tends to become high, as compared with printing in which no pass-to-pass time difference occurs.

In a technology disclosed in JP-A-2009-12390, for a region on which the multi-pass printing is performed, an ink discharge amount is decreased to reduce the occurrence of a phenomenon in that a high-density streak occurs on the region on which the multi-printing is performed.

In the technology disclosed in JP-A-2009-12390, the ink ejection amount is uniformly decreased to reduce the density change that occurs when the pass-to-pass time difference arises, but just the decrease of the ink ejection amount is not sufficient in the reduction of the density change.

SUMMARY

An advantage of some aspects of the invention is that a liquid discharge control apparatus, a liquid discharge control method, and a liquid discharge control program are provided that reduce a density change that appears when multi-pass printing in which a pass-to-pass time difference occurs is performed.

According to one aspect of the invention, a liquid discharge control apparatus that allows a printing apparatus including a printing head linearly driven in a direction across a printing medium to perform printing whose execution number of scan operations by the printing head is changed in accordance with a printed region is configured to include a plurality of mutually different color conversion tables configured to bring about mutually different color conversion results, a color patch printing control unit configured to allow a plurality of color patches targeting predetermined pre-color conversion data and based on the plurality of mutually different color conversion tables to be printed by the printing whose execution number of the scan operations is changed, a selection result acquisition unit configured to select one or more color patches from among the plurality of color patches as a selection result, and a color conversion unit configured to, when printing whose execution number of the scan operations corresponds to each of the one or more selected color patches is performed, select a color conversion table included in the plurality of mutually different color conversion tables and having been used in the selection of the each of the one or more color patches, and perform a color conversion using the selected color conversion table.

In the above configuration, the color patch printing control unit allows a plurality of color patches targeting predetermined pre-color conversion data and based on a plurality of mutually different color conversion tables to be printed by printing whose execution number of the scan operations is changed. Since the execution number of the scan operations is changed, a density difference resulting from such printing occurs even though predetermined pre-color conversion data is targeted. In contrast thereto, since the mutually different color conversion tables are used, the influence by the configuration in which the execution number of the scan operations is changed is compensated for, and as a result, the reduction of the density difference occurs. After one or more color patches that reduce the density difference have been selected by the selection result acquisition unit, when printing whose execution number of the scan operations corresponds to each of the one or more color patches is performed, the color conversion unit selects a color conversion table having been used in the selection of the each of the one or more color patch, and performs a color conversion using the selected color conversion table.

Thus, even when printing whose execution number of the scan operations is changed is performed, the above configuration reduces the density differences among printed colors printed by the printing whose execution number of the scan operations is changed.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, an embodiment according to the invention will be described on the basis of the drawings.

Figure 1:
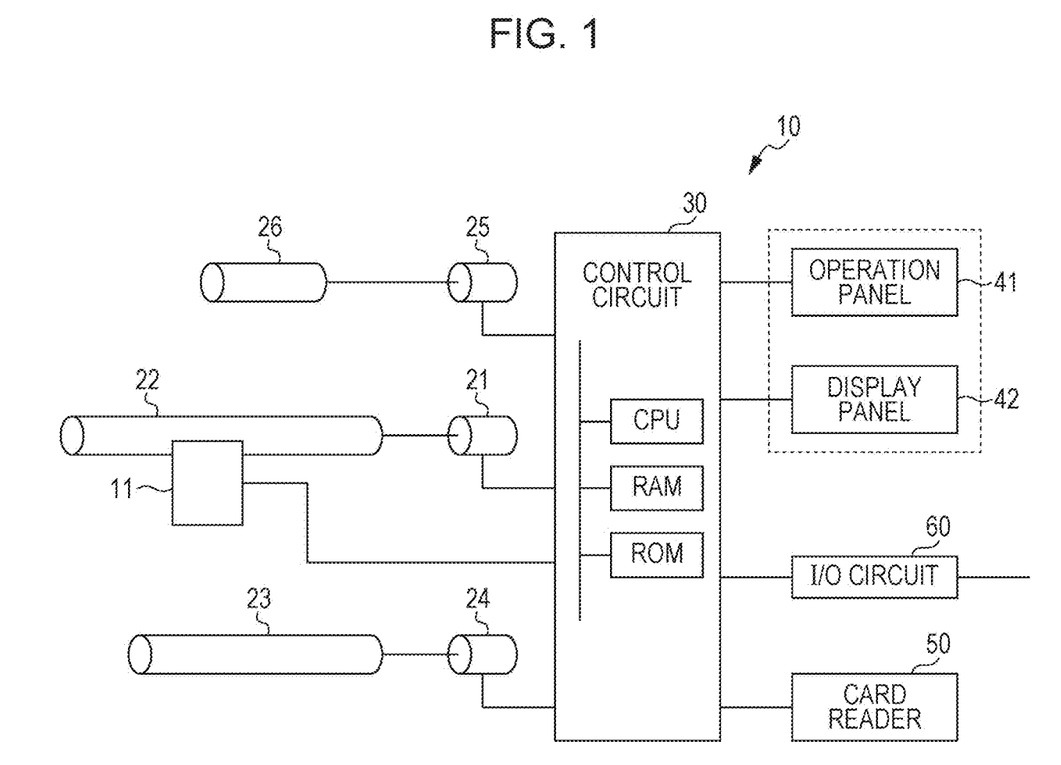
FIG. 1 is a schematic block diagram of an ink jet printer to which the invention is applied.

FIG. 1 illustrates a schematic block diagram of an ink jet printer to which the invention is applied.

In FIG. 1, a printing head 11 of a printer 10 discharges color inks having four colors or six colors and supplied from an ink tank. The printing head 11 is drivingly reciprocated within a predetermined range by a belt 22. This belt 22 is driven by a carriage motor 21. A platen 23 is driven by a platen motor 24 and transports paper in conjunction with the reciprocation of the printing head 11. A paper feed roller 26 supplies paper contained in a predetermined paper stacker, and a feed motor 25 drives this paper feed roller 26. In this case, paper is one example of the printing medium, and the printing head 11 is linearly driven across the width direction of the printing medium.

A control circuit 30 is constituted by combining dedicated ICs, and functionally includes a CPU, a ROM, and a RAM. The control circuit 30 controls the drives of the printing head 11, the carriage motor 21, the platen motor 24, and the feed motor 25. An operation panel 41 and a display panel 42 are attached and coupled to the control circuit 30, and the control circuit 30 allows the operation panel 41 to receive predetermined operations by a user, and allows the display panel 42 to perform predetermined display. The above hardware components will be collectively referred to as a printing mechanism. The printer 10 corresponds to the printing apparatus, and printing control performed by the control circuit 30 corresponds to the liquid discharge apparatus.

A card reader 50 is coupled to the control circuit 30, and when an attachable/detachable memory card is attached to the card reader 50, the control circuit 30 is capable of reading data stored in the memory card and recording predetermined data into the memory card. Further, an I/O circuit 60 is coupled to the control circuit 30, and thus, the control circuit 30 is capable of coupling to a different external device via a wired link or a wireless link. The control circuit 30 acquirers an image data file from the external device or the memory card, and controls the above devices on the basis of the image data file so as to allow printing to be performed.

Figure 2:
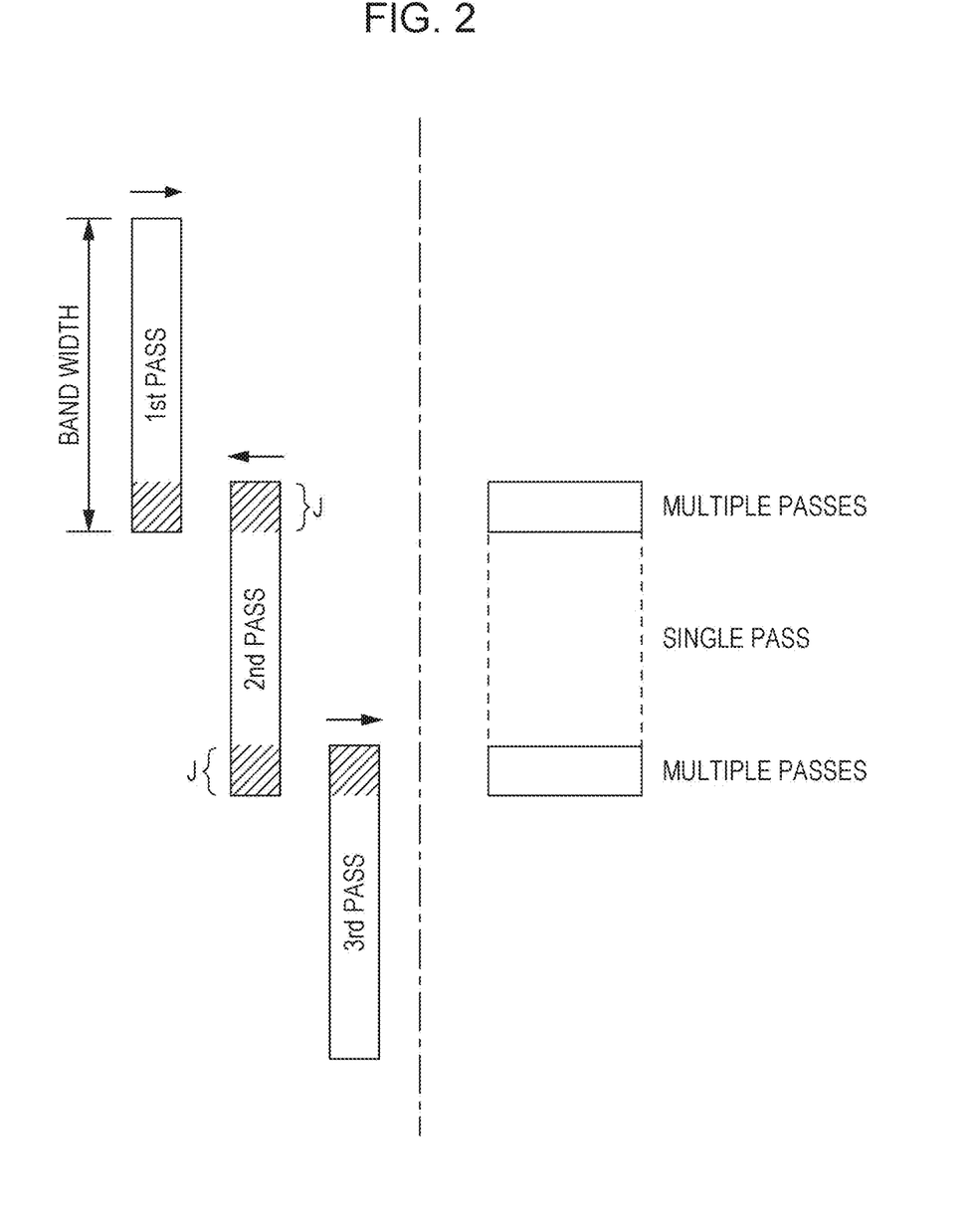
FIG. 2 is a diagram illustrating a status of multi-pass printing.

FIG. 2 is a diagram illustrating a status of multi-pass printing.

When printing is performed by allowing the printing head 11 to perform reciprocating scanning, a black streak or a white streak sometimes appears on a pass-to-pass border portion.

In a left-hand side area of FIG. 2, there is illustrated the degree of overlapping among regions that are subjected to printing through rows of nozzles of the printing head 11 in a 1st pass in which printing is performed while allowing the printing head 11 to move from the left-hand side to the right-hand side, a 2nd pass in which printing is performed while allowing the printing head 11 to move from the right-hand side to the left-hand side, and a 3rd pass in which printing is performed while allowing the printing head 11 to move from the left-hand side to the right-hand side.

The printing head 11 includes nozzles formed in rows therein, and a range in which printing is capable of being performed using nozzles from a first nozzle to a last nozzle will be referred to as a band width. In the multi-pass printing, multi-pass printing is performed using a predetermined, constant number of nozzles at each of an upstream side and a downstream side in the nozzle rows of the printing head 11. In this example, for each of passes, printing is performed in hitch portions J, and in each of the hitch portions J, printing is performed on a multiple-pass basis. Further, and in a portion other than the hitch portions J, printing is performed on a single-pass basis. Performing multi-pass printing on regions each associated with the predetermined, constant number of nozzles at a corresponding one of the upstream side and the downstream side in the nozzle rows allows the pass-to-pass border portion to have its width, and thus, the black streak and the white streak are unlikely to appear.

As shown in a right-hand side portion in FIG. 2, a portion having been subjected to multi-pass printing is formed on each of an upper side portion and a lower side portion between which a portion having been subjected to single-pass printing is sandwiched.

Performing the multi-pass printing results in execution of two successive printing operations between which the pass-to-pass time difference occurs, and thus, the printed color density change, which has been described above in "2. Related art", is likely to occur.

Figure 3:
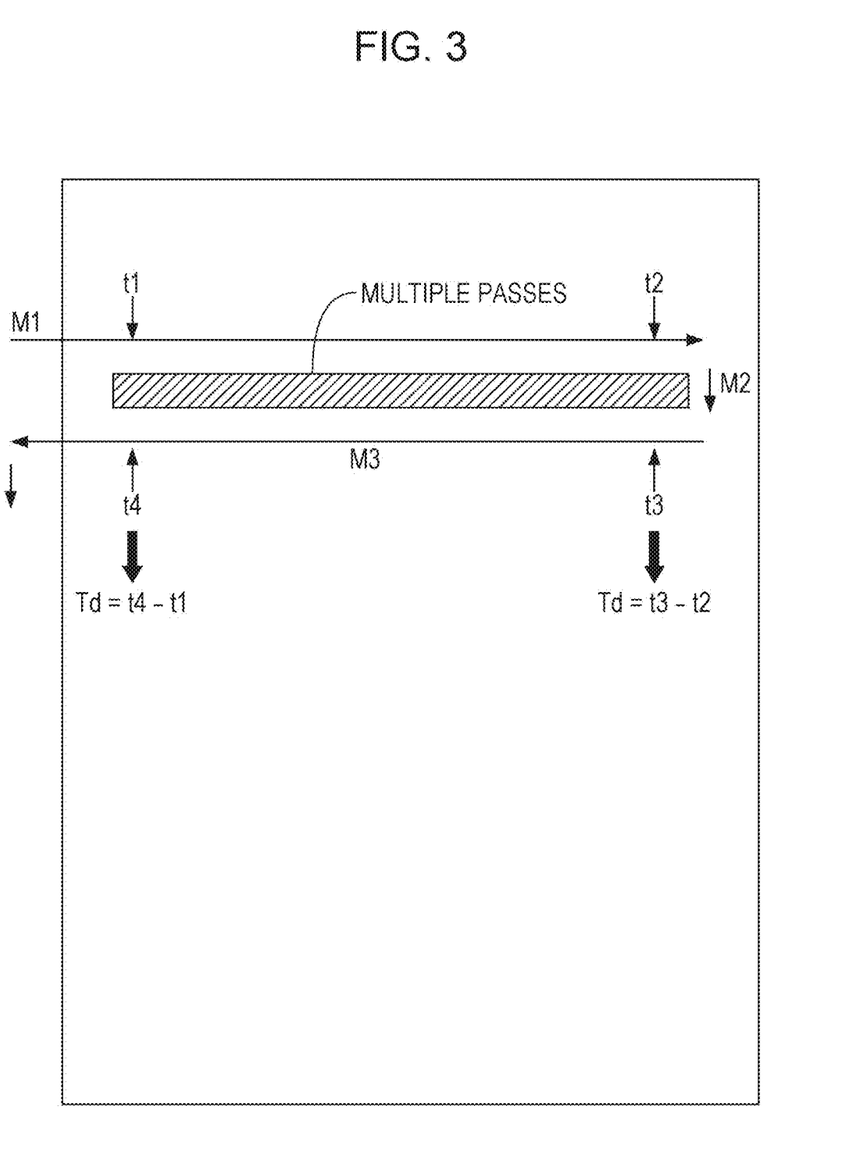
FIG. 3 is a diagram illustrating a status in which a time difference is caused in multi-pass printing.

FIG. 3 is a diagram illustrating a status in which a time difference occurs in multi-pass printing.

FIG. 3 illustrates scan paths of the printing head 11 when bidirectional printing is performed. In first step M1, the printing head 11 is moved from the left side to the right side on the paper by the carriage motor 21. After the movement to a right side position, while waiting at the right side position, in step M2, the paper is fed by a length smaller than the band width by the platen motor 24. In step M3, the printing head 11 is moved from the right side to the left side on the paper by the carriage motor 21. In this way, in each of the hitch portions J, in a subsequent scanning operation, one portion of the rows of nozzles of the printing head 11 faces a region that another portion of the rows of nozzles of the printing head 11 has faced in a prior scanning, and thereby the multi-pass printing is realized In scan paths in which the printing head 11 moves from the left side to the right side and then moves from the right side to the left side, a region denoted by oblique lines in FIG. 3 is subjected to two printing operations between which a time difference occurs. Individual time points are denoted by t1 to t4. In the region denoted by oblique lines, for a portion at the left side, a first printing operation is completed at a time point t1 and a second printing operation is completed at a time point t4. In this case, a time difference between the two printing operations is obtained by (t4−t1). Further, for a portion located at the right side, the first printing operation is completed at a time point t2 and the second printing operation is completed at a time point t3. In this case, a time difference between the two printing operations is obtained by (t3−t2). Naturally, the latter time difference is smaller than the former time difference. As understood from FIG. 3, the time difference is capable of being obtained from scanning paths and a shift position of the printing head.

Figure 4:
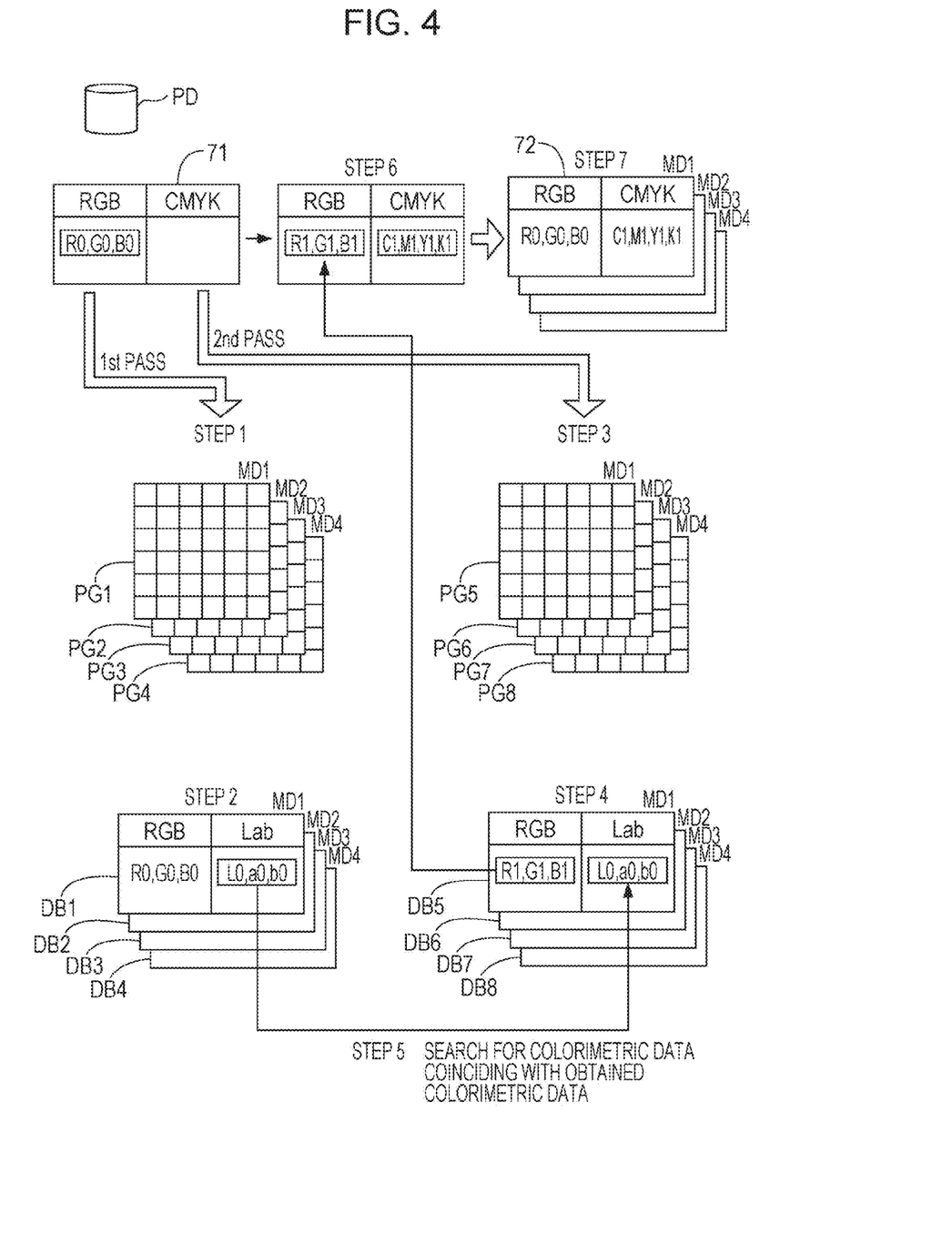
FIG. 4 is a diagram illustrating processing for creating color conversion tables for use in printing whose number of scan operations is changed.
Figure 5:
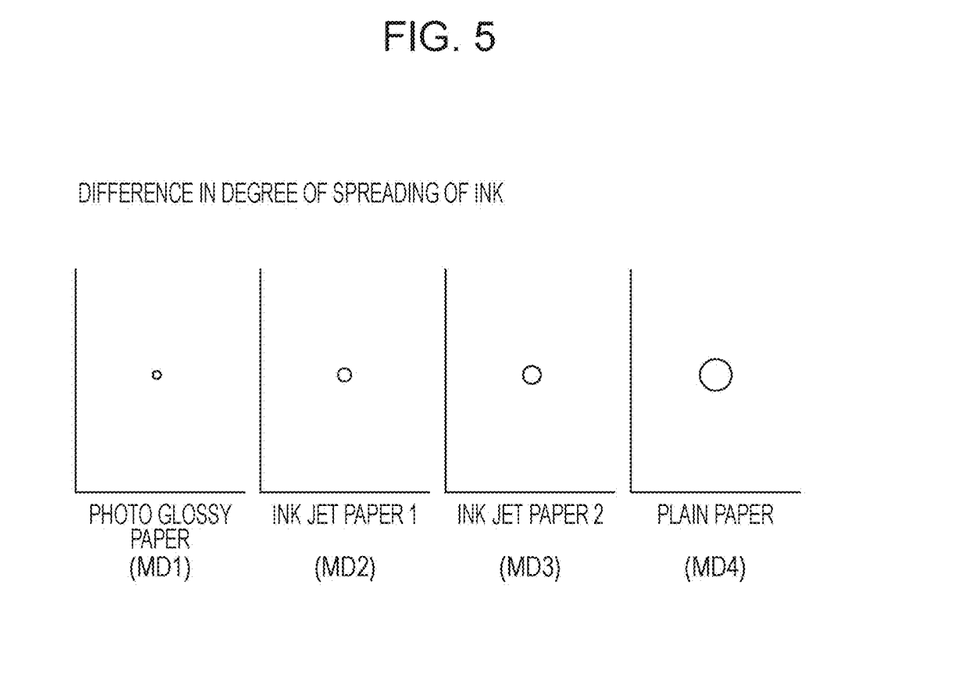
FIG. 5 is a diagram illustrating the degree of spreading of an ink for each of media.

FIG. 4 is a diagram illustrating processing for creating color conversion tables for use in printing whose number of passes is changed. FIG. 5 is a diagram illustrating the degree of spreading of ink for each of media.

In this embodiment, processing for creating color conversion tables that reduce the density difference will be described below. In this case, four kinds of media MD1 to MD4 having mutually different degrees of spreading of ink are used, and printing operations only whose execution numbers of passes are mutually different are performed on each of the four kinds of media MD1 to MD4. The four kinds of media MD1, MD2, MD3, and MD4 respectively correspond to photo glossy paper, ink jet paper 1, ink jet paper 2, and plain paper. For the medium MD1, the degree of spreading of ink is smaller than that of any one of the media MD2 to MD4, and for the medium MD4, the degree of spreading of ink is larger than that of any one of the media MD1 to MD3.

When color patches are printed to create the color conversion tables, it is not realistic to perform printing of color patches for all colors, and thus, the colors of color patches to be printed are limited to predetermined constant numbers of colors. Pieces of RGB-based color data corresponding to the respective colors are stored as a set of patch data PD.

A color conversion table for use in single-pass printing is provided in advance as a reference LUT 71. Further, the color patches are printed on each of the media MD1 to MD4 by single-pass printing, referring to the reference LUT 71 on the basis of the set of patch data PD (step 1). In this case, a plurality of groups of color patches are printed. These groups of printed color patches will be referred to as color patch groups PG1, PG2, PG3, and PG4. Here, the color patch groups PG1, PG2, PG3, and PG4 are respectively provided for the media MD1, MD2, MD3, and MD4. Next, the color patches are subjected to colorimetry. The colorimetric results of the respective color patches are created as databases DB1 to DB4 so as to allow the colorimetric result of each of the color patches to be associated with a pieces of RGB color data corresponding to the each of the color patches (step 2: from colorimetry processing to database creation processing). Here, the databases DB1, DB2, DB3, and DB4 are also respectively created for the media MD1, MD2, MD3, and MD4.

Next, the color patches are printed on each of the media MD1 to MD4 by multi-pass printing on the basis of the set of patch data PD using the reference LUT 71, which is a color conversion table for the single-pass printing (step 3). The number of the passes is at least two, and the passes are performed a required number of times. Though the multi-pass printing is performed, in the case where it is required to perform multi-pass printing twice, multi-pass printing whose number of passes is two is performed. At this time, in order not to reduce the quality of printing, printing is performed by unidirectional printing without feeding paper. In order to perform the multi-pass printing without feeding paper, a device, such as the change of nozzles to be used, is needed. Further, when the pitch of the nozzles does not coincide with the pitch of the dots, as a result, the paper feeding is performed. The employment of the unidirectional printing has a merit in that the misalignments of landing positions of ink droplets due to bidirectional printing do not occur, and further, has a merit in that the unidirectional printing makes the pass-to-pass time difference constant regardless of a shift position of the printing head 11.

Color patch groups PG5, PG6, PG7, and PG8 are provided as the results of executions of the multi-pass printing. Here, the color patch groups PG5, PG6, PG7, and PG8, are also respectively provided for the media MD1, MD2, MD3, and MD4. Next, the color patches are subjected to colorimetry. The colorimetric results of the respective color patches are created as databases DB5 to DB8 so as to allow the colorimetric result of each of the color patches to be associated with a pieces of RGB color data corresponding to the each of the color patches (step 4: from colorimetry processing to database creation processing). Here, the databases DB5, DB6, DB7, and DB8 are also respectively created for the media MD1, MD2, MD3, and MD4.

Next, a piece of colorimetric data (L0, a0, b0) corresponding to each piece of RGB data (R0, G0, B0) is obtained by referring to each of the databases DB1 to DB4, having been created by the single-path printing. Further, in each of the databases DB5 to DB8, a piece of colorimetric data that coincides with the obtained piece of colorimetric data (L0, a0, b0) is searched for, and then, a piece of RGB data corresponding to the piece of colorimetric data having been searched for is obtained (step 5). Referring to FIG. 4, it is understood that, in this example, the piece of RGB data corresponding to the piece of colorimetric data (L0, a0, b0) is a piece of RGB data (R1, G1, B1) included in each of the databases DB5 to DB8, having been created by the multi-pass printing. That is, in the case of the medium MD1, as a result, the result of printing using the reference LUT 71 for single-path printing and being based on the piece of RGB data (R0, G0, B0) coincides with the result of multi-pass printing based on the piece of RGB data (R1, G1, B1).

Next, in the reference LUT 71, a piece of color conversion data (C1, M1, Y1, K1) being a piece of conversion destination data and associated with the piece of RGB data (R1, G1, B1) is found out (step 6). Further, the piece of color conversion data (C1, M1, Y1, K1), for use in the multi-pass printing, is set so as to be associated with the piece of RGB data (R0, G0, B0), which is a piece of color data corresponding to the original color parch. For each of the other ones of the color patches, the same processes as those having been described above are performed to create a color conversion LUT 72 (step 7).

The above method means that, after the conversion of the piece of color data (R0, G0, B0) into the piece of RGB data (R1, G1, B1), when printing is performed based on the piece of color conversion data (C1, M1, Y1, K1) for use in multi-pass printing based on the relevant piece of RGB data (R1, G1, B1), the result of colorimetry results in the piece of colorimetric data (L0, a0, b0), and thus, even when the multi-pass printing is performed, any density difference does not occur. For each of the media MD1 to MD4, the color conversion LUT 72 is created.

Figure 6:
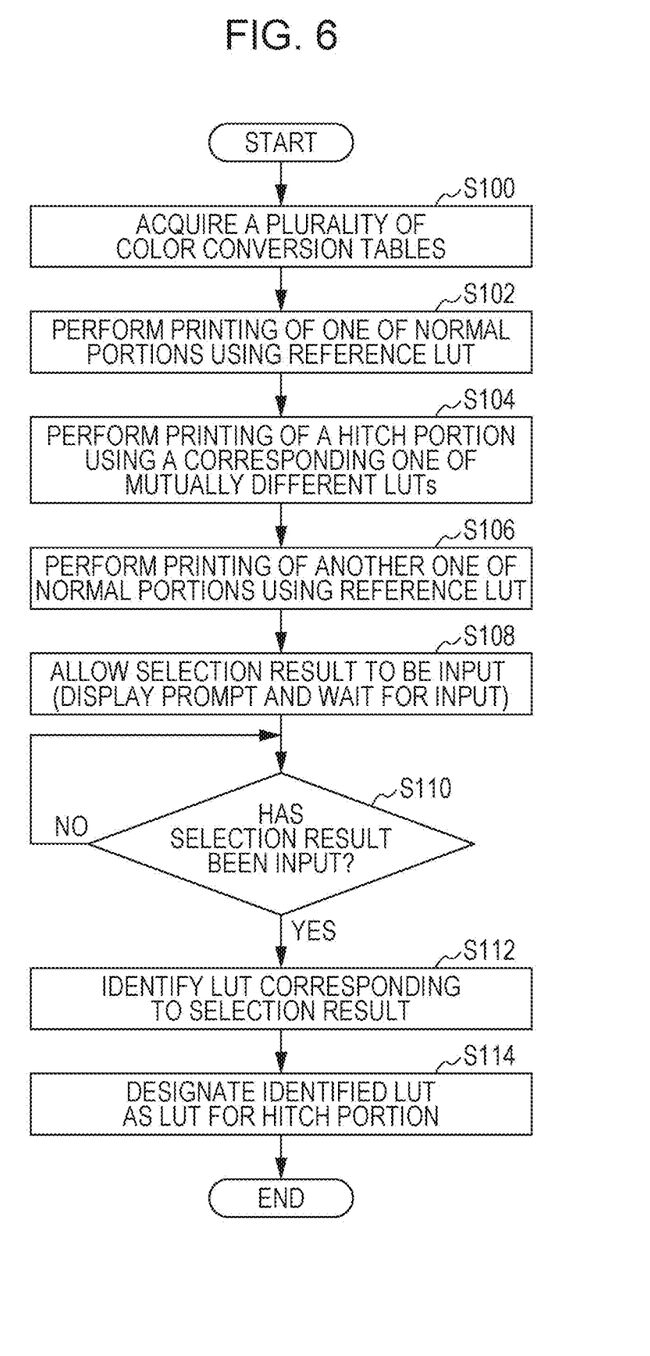
FIG. 6 is a flowchart illustrating processing for setting a color conversion table.

Next, FIG. 6 illustrates a flowchart of processes of setting a color conversion table.

The number of media is too large to be counted. Thus, for all media, the provision of the color conversion LUTs 72 through the processes of the steps having been described above is not a practical countermeasure.

For this reason, when multi-pass printing in which the pass-to-pass time difference occurs is performed, the printed color density change is reduced in such a way as described below.

In this embodiment, the CPU included in the control circuit 30 executes a program corresponding to the flowchart shown in FIG. 6. In step S100, the CPU acquires a plurality of color conversion tables.

The plurality of color conversion tables bring about mutually different color conversion results. In this case, the plurality of color conversion tables correspond to the above-described color conversion LUTs 72, which have been created for the respective media MD1 to MD4, as described above. In this embodiment, the color conversion LUTs 72 are provided in advance, but may be obtained via a network when needed, or may be created by decompressing compressed LUTs.

Figure 7:
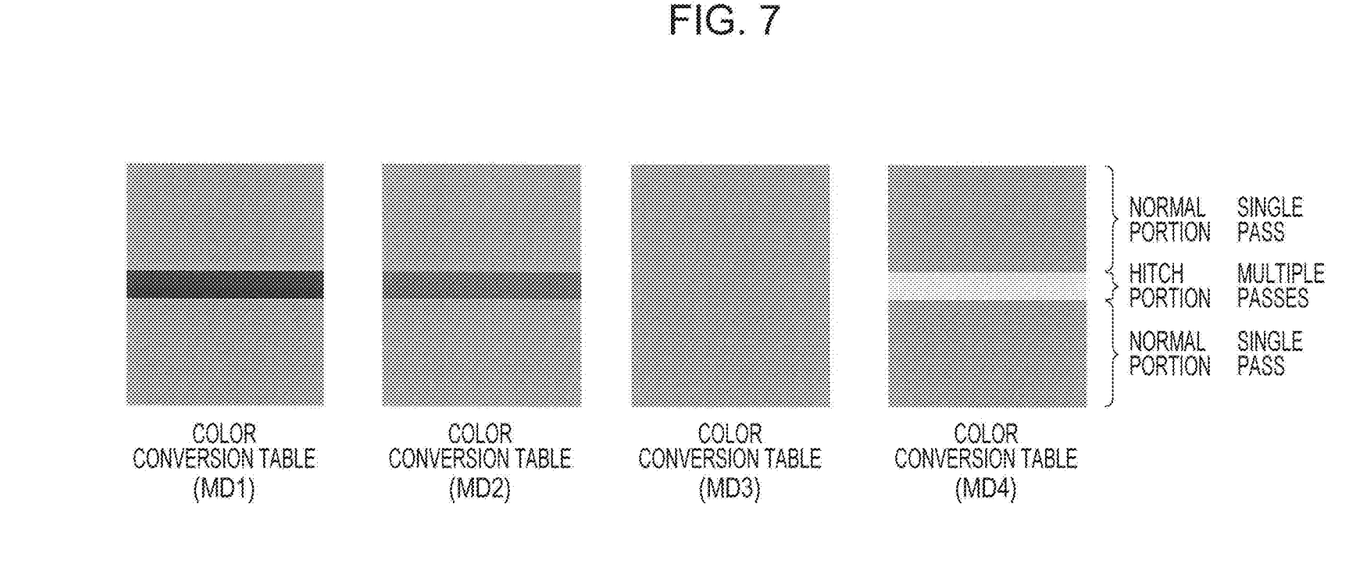
FIG. 7 is a diagram illustrating an example of printed color patches.

Next, FIG. 7 illustrates an example of printed color patches.

Each of the color patches shown in FIG. 7 is composed of a normal portion, a hitch portion, and a normal portion. Each of the color patches that has an approximately rectangular shape includes, in series, a normal portion, a hitch portion, and a normal portion along a direction in which the feed by the platen motor 24 is performed. The normal portion is printed by single-pass printing, and the hitch portion is printed by multi-pass printing. The normal portion is printed on the basis of the result of a color conversion using the reference LUT 71, and the hitch portion is printed on the basis of the result of a color conversion using one of the created color conversion LUTs 72. A color patch is an object resulting from printing on a region on the basis of a piece of constant color data, and in this embodiment, the color patch is an object resulting from filling one independent rectangular-shaped region in one color. A piece of color data to be used is optionally selected. In this embodiment, four color conversion LUTs 72 are provided, and four color patches are printed for one piece of color data. Further, for each of the color patches, normal portions in each of which the single path printing is performed and a hitch portion in which the multi-pass printing is performed are included. In other words, the normal portions and the hitch portion are mutually independent color patches, and the color patch formed by arranging the normal portions and the hitch portion so as to allow the hitch portion to be adjacent to and in contact with each of the normal portions can be called a group of color patches.

In the case of the color patches shown in FIG. 7, each of the color patches is configured so as to have a position relationship in which the hitch portion generated by the multi-pass printing is sandwiched between the normal portions each generated by the multi-pass printing. Further, the length of the hitch portion is shorter than that of the normal portion, and if a difference between the density of the hitch portion and that of the normal portion is large, the difference appears as a streak. In this way, the position relationship, which allows the hitch portion to be sandwiched between the normal portions, facilitates visual recognition of the density difference. Logically, it is possible to arrange the normal portions and the hitch portion so as to allow each of these portions not to be in contact with any other one of these portions. The above configuration, however, that allows a plurality of color patch groups in each of which a plurality of color patches (the normal portions and the hitch portion) are formed so as to allow each of the color patches to be adjacent to and in contact with at least one of the other one or ones of the color patches to be printed facilitates discrimination of the density differences by viewing.

In step S102, the CPU performs printing of a portion (the normal portion) of each of the color patches using the reference LUT 71 by the single-pass printing. In step S104, the CPU performs printing of the hitch portion using one of the color conversion LUTs 72. In step S106, the CPU performs printing of a portion (the normal portion) of each of the color patches using the reference LUT 71 by the single-pass printing. The reference LUT 71 is an LUT that is used in common to the single-pass printing operations. In this case, four color patch groups are printed, and in the printing of each of the four color patch groups, a corresponding one of the mutually different conversion LUTs 72 is used. That is, the printing is performed using the color conversion LUTs 72 having been created for the respective media MD1 to MD4. In this way, each of the four color patch groups is printed using a corresponding one of mutually different LUT groups.

In this embodiment, in each of the color patch groups shown in FIG. 7, the single-path printing, which allows the printing head 11 to perform one scan operation, is performed on each of the normal portion, and the multi-pass printing, which allows the printing head 11 to perform a plurality of scan operations, is performed on the hitch portion so as to allow the color patch (i.e., the hitch portion), on which the multi-pass printing is performed, to be arranged adjacent to and in contact with each of the color patches (i.e., the normal portions), on which the multi-pass printing is performed.

In this way, the color patches included in each of the color patch groups are printed targeting predetermined pre-color conversion data and based on mutually different color conversion tables by printing whose execution number of the scan operations is changed, and the processes in steps S102 to S106 correspond to the processing by the color patch printing control unit.

Upon completion of printing of the color patches, the CPU waits for an input of a selection result in step S108. Here, a GUI or the like is utilized. Specifically, a prompt is displayed on the display panel 42 together with a message "Please select one color patch whose a streak positioned at its center and having a different color density is the most difficult to visually recognize, from among these color patches". For example, numbers 1 to 4 are indicated in number order from the left side to enable a user to use the operation panel 41 and thereby input a selection result using one of the numbers 1 to 4, and the CPU waits for the input. Further, in step S110, the CPU waits until the input of the selection result.

In this way, in this embodiment, such a message is displayed using the display panel 42 and the input of a selection result is awaited using the operation panel 41, that is, a human interface realizes the selection result acquisition unit configured to acquire a selection result.

In this way, the processes in steps S108 and S110 are performed to select one of the color patches, and correspond to the processing by the selection result acquisition unit. Basically, among the results of printing operations whose execution numbers of the passes are mutually different, a color patch having no density difference should be selected. There is, however, not necessarily a color patch that does not have any density difference at all, and further, a color patch having a density difference that is visually recognized as the smallest one may be changed in accordance with the change of environment. Thus, any color patch having a density difference falling within a predetermined range may be selected.

In step S112, the CPU identifies an LUT corresponding to the selection result, and designates the LUT as an LUT for the hitch portion in step S114. For example, when a second color patch from the left side is selected, since it is already known that this color patch is printed using a color conversion LUT 72 corresponding to the medium MD2, it is designated that the multi-pass printing is to be performed using this color conversion LUT 72 corresponding to the medium MD2.

When performing printing after this designation, the control circuit 30 performs the printing by allowing the printing head 11 to discharge ink droplets having predetermined colors while allowing the carriage motor 21 to shift the printing head 11 in the width direction of the printing paper, and allowing the platen motor 24 to feed the printing paper in the length direction of the printing paper to change the relative position between the printing head 11 and the printing paper. In this case, in printing of the normal portion on which the single-pass printing is to be performed, the color conversion is made using the reference LUT 71, and in printing of the hitch portion on which the multi-pass printing is to be performed, the color conversion is made using one of the color conversion LUTs 72 that has been designated in the above way. In this way, a color conversion table having been used in printing of the selected color patch is selected and used in a color conversion for printing whose number of the scan operations corresponds to the selected color patch, and this process corresponds to the processing by the color conversion unit.

It should be noted that, in this embodiment, single-pass printing by one scan operation of the printing head and multi-pass printing by two scanning operations of the printing head are supposed to be performed, but the number of the scanning operations of the printing head is not limited to this configuration. For example, even in the case where printing whose number of the scan operations is two is performed in a printing start portion, printing whose number of the scan operation is one is performed in an intermediate portion, and printing whose number of the scan operations is three is performed in another portion, an appropriate color conversion table is capable of being selected for each of the above three numbers of the scan operations.

Second Embodiment

Figure 8:
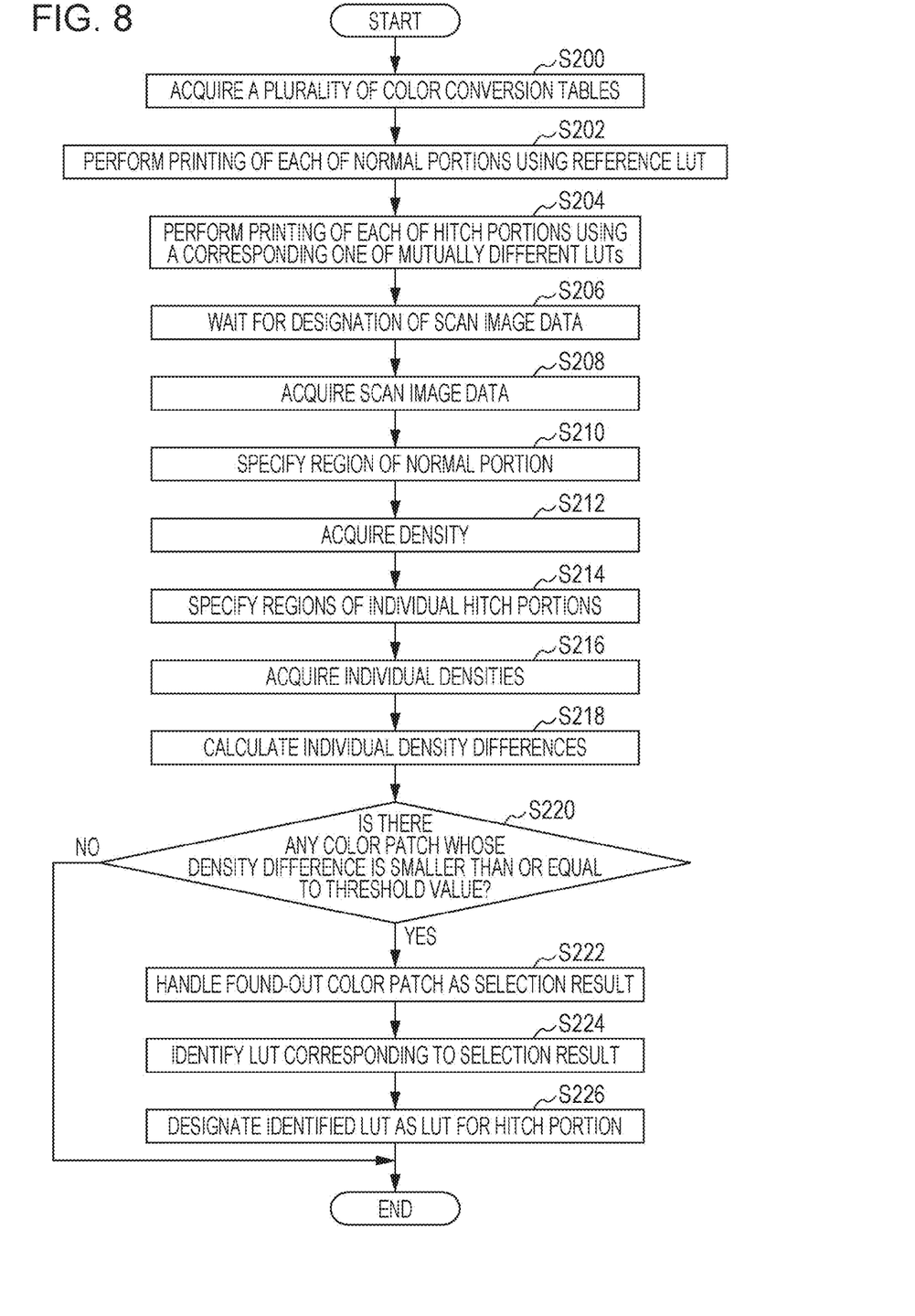
FIG. 8 is a flowchart illustrating processing for setting a color conversion table in a modification example.
Figure 9:
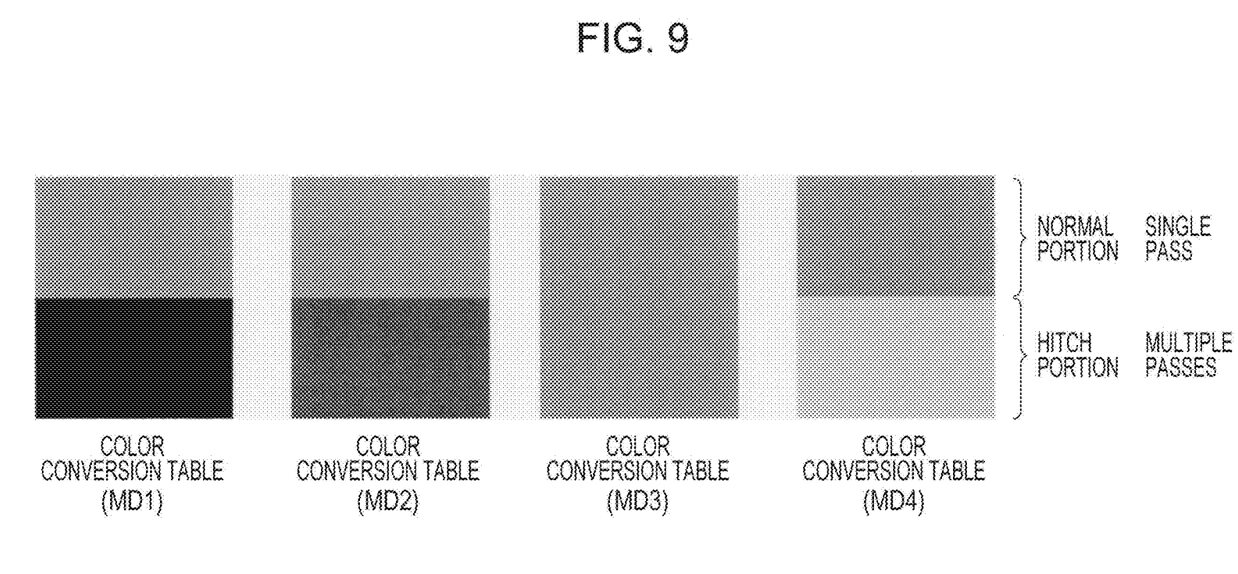
FIG. 9 is a diagram illustrating an example of printed color patches.

FIG. 8 is a flowchart illustrating processing for setting a color conversion table in a modification example, and FIG. 9 is a diagram illustrating an example of printed color patches.

The CPU included in the control circuit 30 executes a program corresponding to the flowchart shown in FIG. 8. In step S200, the CPU acquires a plurality of color conversion tables. The color conversion LUTs 72, which have been created for the respective media MD1 to MD4, correspond to the above plurality of color conversion tables.

Each of the color patches shown in FIG. 9 is composed of a normal portion and a hitch portion. In each of the color patches shown in FIG. 7, there is a position relationship in which the hitch portion is sandwiched between the normal portions, whereas, in each of the color patches shown in FIG. 9, the each color patch is printed so as to allow a normal portion and a hitch portion that have approximately the same size to be adjacent to and in contact with each other. In this embodiment, as described below, the density differences are not determined by human viewing but are determined on the basis of scan images, and the area of not only the normal portion, but also the area of the hitch portion, is enlarged. Naturally, the normal portion is printed using the single-path printing, and the hitch portion is printed using the multi-pass printing. The normal portion is printed on the basis of the result of a color conversion using the reference LUT 71, and each of the hitch portions is printed on the basis of the result of a color conversion using one of the created color conversion LUTs 72. In this embodiment, four color conversion LUTs 72 are provided, and four color patches are printed for one piece of color data.

In this way, each of a plurality of groups of color patches includes a pair of two color patches, one of the two color patches forming the pair being printed using a color conversion table common to the plurality of groups, the other one of the two color patches forming the pair being printed using a color conversion table that is different for each of the plurality of groups patches.

In step S202, the CPU performs printing of a portion (the normal portion) of each of the color patches using the reference LUT 71 by the single-pass printing. In step S204, the CPU performs printing of the hitch portion using one of the color conversion LUTs 72. In this case, four color patch groups are printed, and the printing of each of the four color patch groups is performed using a corresponding one of the mutually different conversion LUTs 72.

After the printing of the color patches, color images thereof are read through a scanner. An external scanner may be used as this scanner. Image data resulting from this reading through the scanner may be output via a network, or may be written into a memory card readable by the card reader 50.

After the printing of the color patches, the CPU waits for a designation of scan image data in step S206. In order to receive the designation, the CPU displays a message for prompting the designation of the scan image data, and waits for an operation for the designation using the operation panel 41.

Since the scan image data exists in a predetermined directory of a computer on a network, a memory card to be attached to the card reader 50, or the like, a configuration that enables designation of one of such directories may be provided.

Upon designation of the existence position of the scan image data, the CPU acquires the scan image data in step S208. The color patches are printed on a scanned document in steps S202 and S204, and location information in relation to each of the color patches is grasped. Thus, the CPU specifies the regions of the normal portions in step S210, and acquires pieces of density data in step S212. The normal portions exist in the respective color patches, and an average value obtained from the pieces of density data may be handled as the density of the normal portion, or a value of any one of the pieces of density data may be handled as the density of the normal portion on behalf of the densities of the respective normal portions. Next, the CPU specifies the regions of the hitch portions included in the respective color patches in step S214, and acquires the densities of the respective hitch portions in step S216. Herein, the term "density" is a generic attribute expression related to color data and encompassing various attribute expressions, such as hue and brightness.

The CPU calculates density differences of the respective color patches in step S218. The density differences mean the differences between the densities of the regions of the respective hitch portions and the density of the region of the normal portion. Each of these regions corresponds to a printed portion. In general, it is sufficient just to calculate color differences, but this embodiment is not limited to the color differences. Upon completion of the calculations of the individual density differences, the CPU determines whether or not there is any color patch whose density difference is smaller than or equal to a threshold value. When the color difference is calculated, Δ2E may be used as the threshold value. It is generally said that Δ2E is an approximate limit of visual recognition by human viewing. In the comparison with the threshold value, environment may be taken into account. For example, the designation of a kind of illumination of the place where an observer is positioned enables determination on whether or not the density difference is easily viewed and recognized taking into account the influence of the illumination. Further, in the case where, in step S220, it is determined that there is not any color patch whose density difference is smaller than or equal to the threshold value, the process flow is terminated without the designation of an LUT for the hitch portion. In this case, a message for informing the relevant determination result may be displayed, or an http address to be referred to may be displayed as one countermeasure.

When it is determined that there is a color patch whose density difference is smaller than or equal to the threshold value, the CPU handles the relevant color patch as a selection result in step S222, identifies a color conversion LUT 72 corresponding to the selection result in step S224, and designates the identified color conversion LUT 72 as a color conversion LUT 72 for use in printing of the hitch portion in step S226. Here, the processes in which the density differences corresponding to the respective color patches are obtained and the obtained density differences are compared with the threshold vale correspond to the processing for selecting one or more color patches by the selection result acquisition unit.

When performing printing after this designation, the control circuit 30 performs the printing by allowing the printing head 11 to discharge ink droplets having predetermined colors while allowing the carriage motor 21 to shift the printing head 11 in the width direction of the printing paper, and allowing the platen motor 24 to feed the printing paper in the length direction of the printing paper to change the relative position between the printing head 11 and the printing paper. In this case, in printing of the normal portion on which the single-pass printing is to be performed, the color conversion is made using the reference LUT 71, and in printing of the hitch portion on which the multi-pass printing is to be performed, the color conversion is made using one of the color conversion LUTs 72 that has been designated in the above way.

Figure 10:
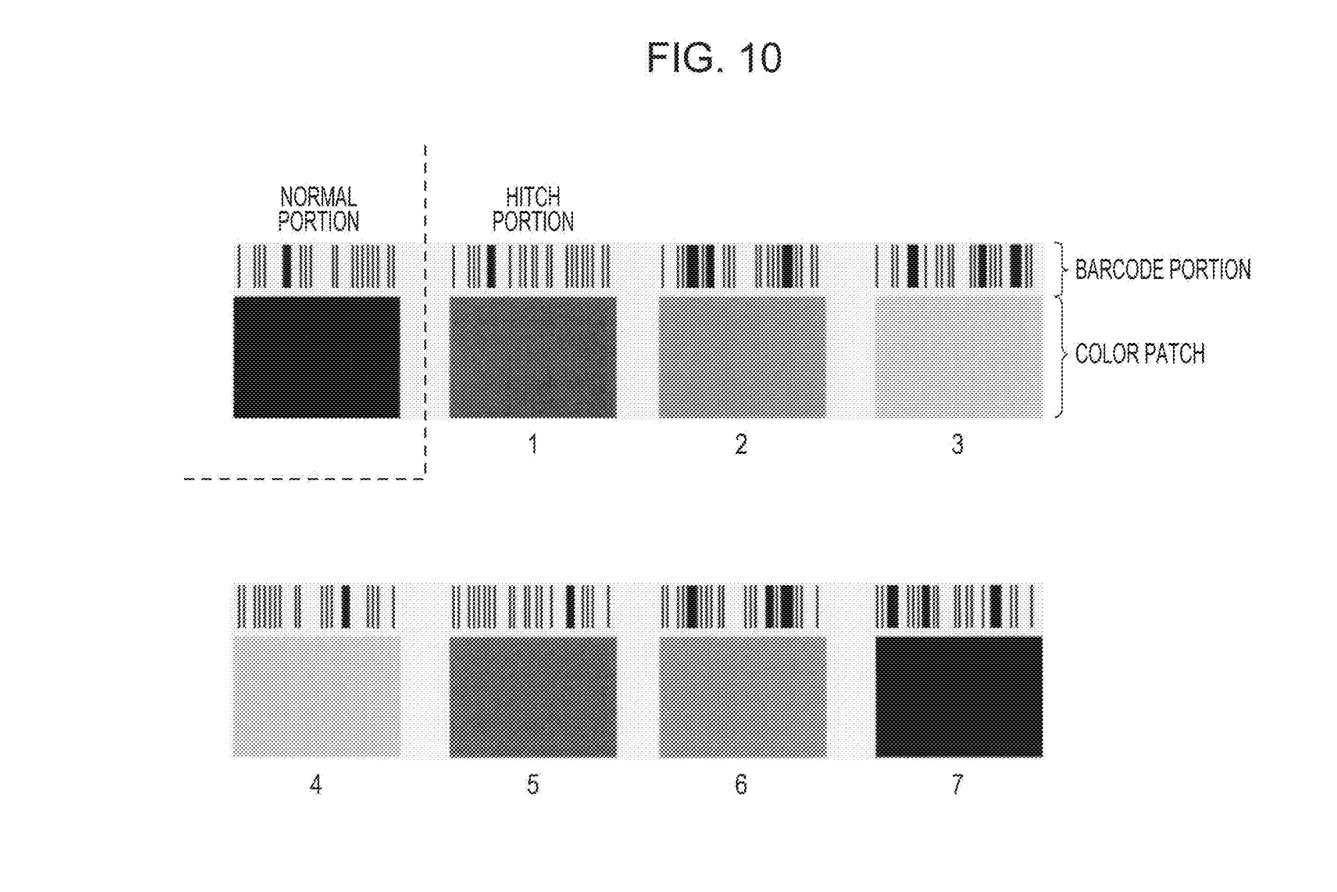
FIG. 10 is a diagram illustrating an example of printed color patches.

As described above, in step S208, the scan image data related to the color patches is acquired, and in step S218, density differences of printed portions each associated with a corresponding one of mutually different execution numbers of the scan operations are calculated. Further, in step S220, a pair of two color patches whose density difference falls within a predetermined range is specified as a selection result Third Embodiment FIG. 10 is a diagram illustrating an example of printed color patches. In each of the color patches shown in each of FIGS. 7 and 9, the normal portion and the hitch portion are printed so as to be adjacent to and in contact with each other. In the color patches shown in FIG. 7, the normal portion and the hitch portion are desirable to be adjacent to and in contact with each other because the density difference is visually recognized by human being. When, however, the scan image data is acquired and the density differences are calculated by making a comparison of the acquired scan image data, it is not necessary to purposely arrange the normal portion and the hitch portion so as to allow the normal portion and the hitch portion to be adjacent to and in contact with each other.

For this reason, as shown in FIG. 10, color patches for which printing conditions are mutually different are independently printed so as to be distanced from one another. As shown in FIG. 10, when the color patches are supposed to be printed in the form of two rows and four columns, the aforementioned normal portion is printed at only one upper-left position, and each of the other portions is not the normal portions but is the hitch portion or the like. Further, in this example, a piece of data corresponding to each of the color patches is printed in the form of a barcode or a two-dimensional barcode together with the each of the color patches. In FIG. 10, each of the color patches is printed together with a corresponding one of numbers 1 to 7, and further, each of the barcodes is printed along the upper portion of a corresponding one of the color patches. The printing of the barcodes or the two-dimensional barcodes enables realization of, when each of the pieces of scan image data is analyzed, associating various kinds of data with a corresponding one of the color patches. For example, associating data content (RGB data) that becomes the source of each color patch with the each color patch reduces processes to be carried out by persons even when a large number of color patches are printed, and further enables realization of using as many color patches as possible to obtain accurate association relationships.

It should be noted that a liquid discharge control method is realized by individual steps that allow the above-described processes to be performed along with the elapse of time, and the flow of commands that allow the CPU (a computer) included in the control circuit 30 to execute the above-described processes constitutes a printing control program.

Further, needless to say, the invention is not limited to the aforementioned embodiments. Further, any person skilled in the art could appreciate that the following technologies should be disclosed as embodiments of the invention: technologies obtained by appropriately changing the combinations of mutually replaceable components, configurations, and the like that have been disclosed in the aforementioned embodiments, and applying the changed combinations; technologies obtained by appropriately replacing components, configurations, and the like that have been disclosed in the aforementioned embodiments by components, configurations, and the like that are not disclosed in the aforementioned embodiments but are known technologies and are capable of being substituted for the components, the configurations, and the like that have been disclosed in the aforementioned embodiments, changing the combinations of components, configurations, and the like that result from the replacements, and applying the changed combinations; and technologies obtained by appropriately replacing components, configurations, and the like that have been disclosed in the aforementioned embodiments by components, configurations, and the like that are not disclosed in the aforementioned embodiments, but are supposed by those skilled in the art to be substitutions for the components, the configurations, and the like that have been disclosed in the aforementioned embodiments, changing the combinations of components, configurations, and the like that result from the replacements, and applying the changed combinations.

This application claims priority under 35 U.S.C. § 119 to Japanese Patent Application No. 2016-058108, filed Mar. 23, 2016. The entire disclosure of Japanese Patent Application No. 2016-058108 is hereby incorporated herein by reference.

What is claimed is:

1. A liquid discharge control apparatus that allows a printing apparatus including a printing head linearly driven in a direction across a printing medium to perform printing whose execution number of scan operations by the printing head is changed in accordance with a printed region, the liquid discharge control apparatus comprising:
  a plurality of mutually different color conversion tables configured to bring about mutually different color conversion results;
  a color patch printing control circuit configured to allow a plurality of color patches targeting predetermined pre-color conversion data and based on the plurality of mutually different color conversion tables to be printed by the printing whose execution number of the scan operations is changed;
  a selection result acquisition circuit configured to select one or more color patches from among the plurality of color patches as a selection result; and
  a color conversion circuit configured to, when printing whose execution number of the scan operations corresponds to each of the one or more selected color patches is performed, select a color conversion table included in the plurality of mutually different color conversion tables and having been used in the selection of the each of the one or more color patches, and perform a color conversion using the selected color conversion table,
wherein the plurality of color patches form a plurality of groups each including a pair of two color patches, and
wherein the color patch printing control circuit allows one of the two color patches forming the pair to be printed using a color conversion table constituting the plurality of mutually different color conversion tables and being common to the plurality of groups, and allows another one of the two color patches forming the pair to be printed using a color conversion table constituting the plurality of mutually different color conversion tables and being different for each of the plurality of groups.

2. The liquid discharge control apparatus according to claim 1, wherein the selection result acquisition circuit includes a human interface and allows the selection result to be acquired through the human interface.

3. The liquid discharge control apparatus according to claim 1,
wherein the selection result acquisition circuit acquires scan images of the plurality of color patches, and calculates density differences of every pairs of two printed color patches among printed color patches forming each of at least one color patch group and included in the plurality of color patches, each of the printed color patches being a printed portion associated with a corresponding one of mutually different execution numbers of the scan operations, and
wherein, when each of the calculated density differences in relation to each of at least one of the at least one color patch group falls within a predetermined range, the selection result acquisition circuit acquires the at least one of the at least one color patch group as the selection result.

4. The liquid discharge control apparatus according to claim 1, wherein the color patch printing control circuit allows multi-pass printing in which printing is performed by a plurality of scanning operations by the printing head and single-pass printing in which printing is performed by one scanning operation by the printing head to be performed to allow pairs each including one of the plurality of color patches that is printed by the single-pass printing and one of the plurality of color patches that is printed by the multi-pass printing to be printed such that the one of the plurality of color patches that is printed by the single-pass printing and the one of the plurality of color patches that is printed by the multi-pass printing are adjacent to and in contact with each other.

5. The liquid discharge control apparatus according to claim 1, wherein the color patch printing control circuit allows a plurality of groups each including printed color patches constituting the plurality of color patches, each of the printed color patches having been printed by printing whose execution number of the scan operations corresponds to the each of the printed color patches, such that, for each of the plurality of color patches, each of the printed color patches is adjacent to and in contact with at least one of any other one or ones of the printed color patches.

6. The liquid discharge control apparatus according to claim 1, wherein, when allowing the plurality of color patches to be printed by the printing whose execution number of the scan operations is changed, the color patch printing control circuit allows unidirectional printing to be performed without feeding the printing medium.

7. A liquid discharge control method that allows a printing apparatus including a printing head linearly driven in a direction across a printing medium to perform printing whose execution number of scan operations by the printing head is changed in accordance with a printed region, the liquid discharge control method comprising:
printing a plurality of color patches targeting predetermined pre-color conversion data and based on a plurality of mutually different color conversion tables that bring about mutually different color conversion results by performing the printing whose execution number of the scan operations is changed, the plurality of color patches forming a plurality of groups each including a pair of two color patches;
acquiring a selection result of a selection of one or more color patches from among the plurality of color patches;
selecting, when printing whose execution number of the scan operations corresponds to each of the selected one or more color patches is performed, a color conversion table included in the plurality of mutually different color conversion tables and having been used in the selection of the each of the one or more color patches, and performing a color conversion using the selected color conversion table; and
printing one of the two color patches forming the pair using a color conversion table constituting the plurality of mutually different color conversion tables and being common to the plurality of groups, and printing another one of the two color patches forming the pair using a color conversion table constituting the plurality of mutually different color conversion tables and being different for each of the plurality of groups.

8. A non-transitory computer readable medium storing a liquid discharge control program that allows a printing apparatus including a printing head linearly driven in a direction across a printing medium to perform printing whose execution number of scan operations by the printing head is changed in accordance with a printed region, the liquid discharge control program being configured to allow a computer to execute processing comprising:
a process of printing a plurality of color patches targeting predetermined pre-color conversion data and based on a plurality of mutually different color conversion tables that bring about mutually different color conversion results by performing the printing whose execution number of the scan operations is changed, the plurality of color patches forming a plurality of groups each including a pair of two color patches;
a process of acquiring a selection result of a selection of one or more color patches from among the plurality of color patches;
a process of selecting, when printing whose execution number of the scan operations corresponds to each of the selected one or more color patches is performed, a color conversion table included in the plurality of mutually different color conversion tables and having been used in the selection of the each of the one or more color patches, and of performing a color conversion using the selected color conversion table; and
a process of printing one of the two color patches forming the pair using a color conversion table constituting the plurality of mutually different color conversion tables and being common to the plurality of groups, and of printing another one of the two color patches forming the pair using a color conversion table constituting the plurality of mutually different color conversion tables and being different for each of the plurality of groups.

* * * * *